(12) United States Patent
Braginsky et al.

(10) Patent No.: US 6,352,349 B1
(45) Date of Patent: Mar. 5, 2002

(54) ILLUMINATION SYSTEM FOR USE IN IMAGING MOVING ARTICLES

(75) Inventors: Mark B. Braginsky, Longmeadow, MA (US); Robert H. Esslinger, Wilton, CT (US); William D. Hess, Clinton Corners; Peter R. Gluege, Warwick, both of NY (US)

(73) Assignee: United Parcel Services of America, Inc., Atlanta, GA (US)

(*) Notice: Subject to any disclaimer, the term of this patent is extended or adjusted under 35 U.S.C. 154(b) by 0 days.

(21) Appl. No.: 09/535,051

(22) Filed: Mar. 24, 2000

(51) Int. Cl.[7] .............................................. G03B 15/02
(52) U.S. Cl. ............................. 362/8; 362/11; 362/16; 362/18
(58) Field of Search ................................ 362/8, 11, 16, 362/17, 18, 146

(56) References Cited

U.S. PATENT DOCUMENTS

| | | | |
|---|---|---|---|
| 3,569,961 A | 3/1971 | Ricard | 362/337 |
| 3,809,462 A | 5/1974 | Baumgardner et al. | 359/726 |
| 3,982,116 A | 9/1976 | Sakuma | 362/304 |
| 4,689,490 A | 8/1987 | Thomas et al. | 250/566 |
| 4,733,335 A | 3/1988 | Serizawa et al. | 362/503 |
| 4,911,532 A * | 3/1990 | Hidaka | 359/629 |
| 5,022,740 A | 6/1991 | Maziorka | 359/440 |
| 5,040,883 A | 8/1991 | Cobb, Jr. | 359/742 |
| 5,090,804 A * | 2/1992 | Wong et al. | 356/237.2 |
| 5,245,172 A | 9/1993 | Esslinger et al. | 250/201.2 |
| 5,245,411 A | 9/1993 | Dury | 356/446 |
| 5,308,960 A | 5/1994 | Smith et al. | 235/454 |
| 5,313,373 A | 5/1994 | Bjorner et al. | 362/19 |
| 5,388,035 A | 2/1995 | Bodem, Jr. | 362/545 |
| 5,430,282 A | 7/1995 | Smith et al. | 235/455 |
| 5,485,263 A | 1/1996 | Bjorner et al. | 356/4.01 |
| 5,521,365 A | 5/1996 | Malatesta | 235/454 |
| 5,538,065 A | 7/1996 | Geraud | 160/85 |
| 5,600,116 A | 2/1997 | Seo et al. | 235/455 |
| 5,607,229 A | 3/1997 | Rykowski et al. | 362/346 |
| 5,761,540 A * | 6/1998 | White | 396/4 |
| 5,777,743 A | 7/1998 | Bacchi et al. | 356/370 |
| 5,791,771 A | 8/1998 | Bjorner et al. | 362/297 |
| 5,818,528 A | 10/1998 | Roth et al. | 348/364 |
| 5,821,518 A | 10/1998 | Sussmeier et al. | 235/462.01 |

OTHER PUBLICATIONS

UV Filters/Light Control Film, Mounted And Unmounted Glass UV Filters, Industrial Optics Division; pp. 65 and 66.
Allard Graphic Arts, Fresnel Lens, pp. 1068–1070.

* cited by examiner

Primary Examiner—Sandra O'Shea
Assistant Examiner—Ronald E. Delgizzi
(74) Attorney, Agent, or Firm—Alston & Bird LLP

(57) ABSTRACT

An apparatus and method for illuminating articles, such as parcels, moving beneath a camera on a conveyor belt. Multiple light sources are positioned alongside the conveyor to direct light angled downwardly and from the side of the conveyor. Each light source has an elongated lamp angled with respect to the surface of the article and a light directing device, preferably a Fresnel lens, positioned to receive light from the lamp and to direct the light toward the surface at an angle equal to or greater than forty degrees from an optical axis of the camera.

24 Claims, 11 Drawing Sheets

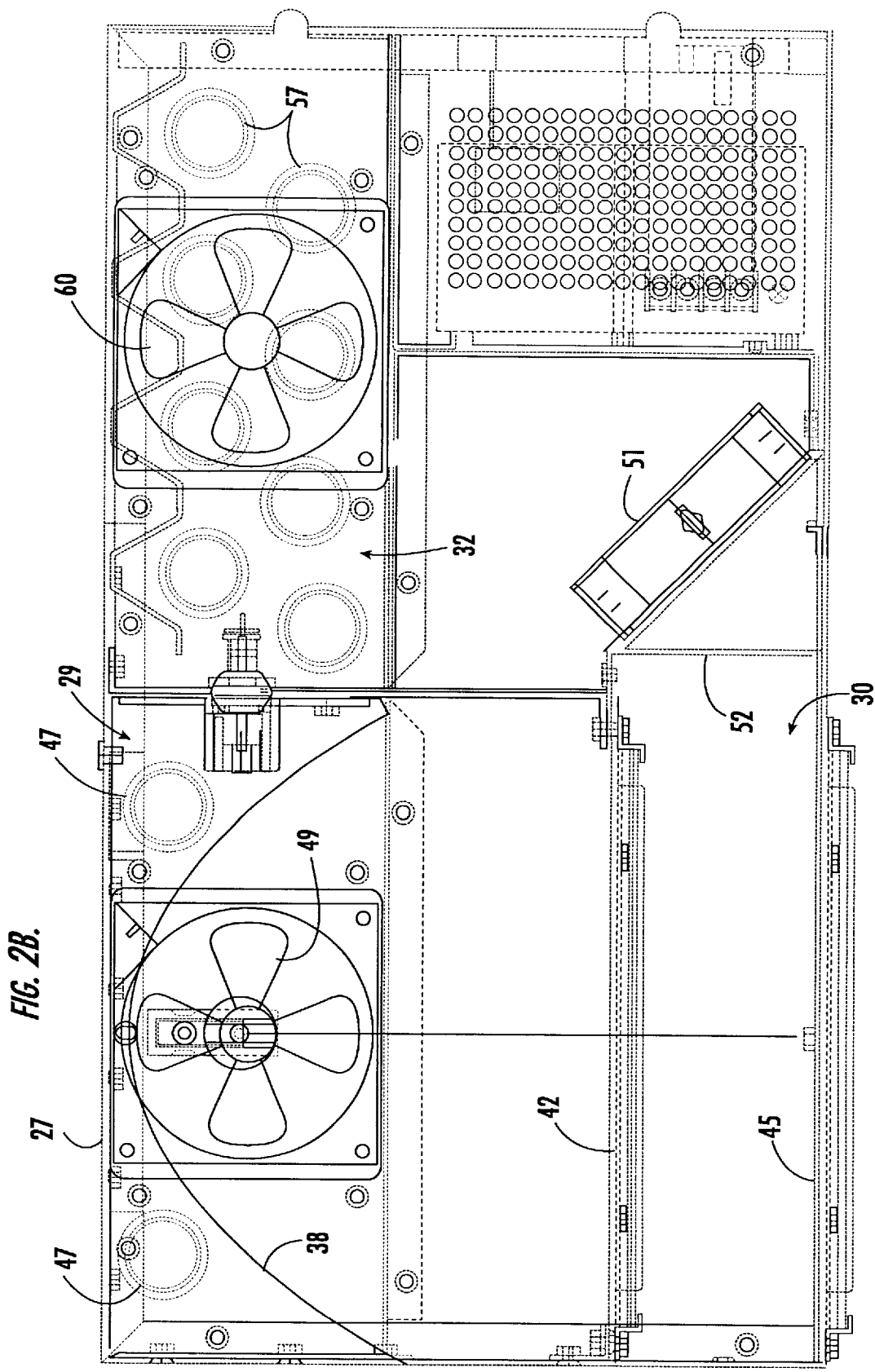

ILLUMINATION SYSTEM FOR USE IN IMAGING MOVING ARTICLES

TECHNICAL FIELD

The present invention relates to camera lighting systems, and more particularly relates to an apparatus and method for illuminating articles moving beneath a camera on a conveyor belt.

BACKGROUND ART

Automatic conveyor systems have been developed for handling and sorting articles, such as parcels or components of manufactured goods. The articles bear identifying indicia, for example, dense two-dimensional symbols, bar codes, and text suitable for optical character recognition. An overhead linear CCD (Charge Coupled Device) camera can capture narrow images of a field of view across a "scan line" that is very short in the direction of conveyor travel, but extends across the conveyor. A computer receiving the output of the camera can build from these linear images a full digital image of a parcel or a label passing under the camera. When the articles have varying heights, the camera can take an image anywhere in a "scan plane" projected downward from the camera to the scan line.

Prior illumination systems have produced an intensive strip of light along the scan line by using elliptical cylinders as reflectors behind an elongated tubular lamp. The lamp lies along one focal axis of the ellipse, while the surface to be illuminated lies near the other focal axis. The light source may be inclined about the axis of the scan line so as not to obstruct the camera's field of view. Generally, the region of focused bright illumination is not vertically deep within the scan plane, and thus the efficacy of this configuration is limited when the articles passing beneath the camera vary widely in height.

Such an illumination system seeks to direct enough light reflected from the subject article to the camera to obtain a sharp image, without blinding the camera with glare. Thus, the light sources should provide a large amount of diffuse reflection to the camera, but no specular reflection. However, articles with shiny upper surfaces present a particular challenge. If the angle of inclination of the light source about the scan line is small, the camera may be blinded by glare reflected from glossy packages or from plastic protectors used to protect paper labels. If the angle of inclination is large, tall articles may cast shadows onto leading or trailing articles when they are under the camera. At an optimum angle close to forty-five degrees, the light source can cover only a relatively small depth vertically in the scan plane, because elliptical reflectors cast a narrow beam transverse to the length of the reflector. One prior system provides an unsymmetrical elliptical reflector to illuminate a vertical region in the scan plane, but this approach does not solve all the problems noted above.

Patents disclosing illumination systems include U.S. Pat. Nos.:

| | | |
|---|---|---|
| 3,569,961 | 3,809,462 | 3,982,116 |
| 4,689,490 | 4,733,335 | 5,022,740 |
| 5,040,883 | 5,245,411 | 5,308,960 |
| 5,313,373 | 5,388,035 | 5,430,282 |
| 5,521,365 | 5,538,065 | 5,600,116 |
| 5,607,229 | 5,777,743 | 5,791,771 |
| 5,818,528 | 5,821,518 | |

There is a need in the art for an illumination system capable of providing adequate diffuse light to an overhead camera, reflected from a vertical region sufficient to accommodate a range of article heights. The illumination system should avoid reflecting glare to the camera, and should direct light so that tall articles do not cast shadows into the illuminated region.

SUMMARY OF THE INVENTION

The present invention seeks to provide a system and method for illuminating a surface of an article being imaged by a camera so as to reflect diffuse light to the camera from articles of varying heights.

In accordance with the invention, this object is accomplished in an illumination system by providing an apparatus for illuminating a surface of an article being imaged by a camera, comprising an elongated light source angled with respect to the surface of the article and positioned alongside the article to direct light toward the surface; and a light directing device positioned to receive light from the light source and to direct the light toward the surface at an angle equal to or greater than forty degrees from an optical axis of the camera. By constraining essentially all of the light rays to angles 40 degrees or more from the optical axis of the camera, the system avoids a level of specular reflection or glare that would deteriorate the image of symbols or text on the surface of the articles to the extent of preventing reliable decoding or reading of such symbols or text. When the invention is incorporated in a conveyor system in which the articles are moved on a conveyor, the light source is positioned alongside the conveyor to direct light angled downwardly and from the side of the conveyor. The light directed by the light directing device forms an illuminated strip on an upper surface of the articles transverse to their direction of travel.

In one embodiment of the invention, the light source is an elongated lamp and an elongated reflector positioned to reflect light from the lamp toward the articles, and the light directing device is a Fresnel lens. Preferably, the Fresnel lens has an optical axis that is offset from an axis of symmetry of the light source. To avoid specular reflection into the camera, the Fresnel lens bends light from the light source to a larger angle with respect to the optical axis of the camera. The optical axis of the lens is offset from the axis of symmetry of the light source away from the article along the direction of the optical axis of the camera to more efficiently illuminate both short and tall articles. A barrier, such as a housing surrounding the light directing device, may be used to block light from the light source except light passing through the light directing device.

The invention also provides an automatic conveyor system in which the longitudinal axis of the lamp is approximately perpendicular to the path of travel of articles along the conveyor. The reflector preferably is an elliptical surface and the lamp lies along a first focal axis of the elongated reflector. The second focal axis of the reflector preferably lies a distance beneath the conveyor. In the preferred embodiment, the Fresnel lens is positioned a distance from the lamp from about ¼ to about ½ times the focal length of the Fresnel lens and a distance from a central axis of the conveyor approximately equal to 1 to 2 times the focal length of the Fresnel lens, and the optical axis of the Fresnel lens is offset from the axis of symmetry of the reflector by a distance from about 0.5 to 1 times the length of the lamp filament.

In a preferred embodiment, the illumination system includes a plurality of illumination assemblies, including light sources and light directing devices, positioned to provide light to the illuminated region of the camera's scan plane. Optimally, four such assemblies are provided, the first and second assemblies on one side of the conveyor, one above the other, and the third and fourth assemblies on the opposite side of the conveyor, one above the other. When only one illumination assembly is present, preferably its symmetry plane substantially coincides with the camera's scan plane. When a plurality of illumination assemblies are used, they may be aligned with the camera's scan plane to maximize illumination. Optionally, they may be positioned with their symmetry planes slightly mis-aligned to create a thickness in the illuminated region spanning the scan plane, and thus in the illuminated strip on the surface of the article.

In preferred embodiments of the invention, the lamps, reflectors, lenses, and barriers are selected, assembled and oriented such that the articles are illuminated from the side of the conveyor, such that essentially all of the light exiting the lens is aligned at an angle equal to or greater than forty-five degrees from the optical axis of the camera, and such that diffuse reflection but essentially no specular reflection from the articles reaches the camera. Because the light sources are to the side of the conveyor, tall articles cannot cast shadows on leading or trailing articles. The preferred arrangement of multiple light sources illuminates a deep region of the scan plane without the need to position any light source so high as to create glare into the camera.

The present invention also provides a method for illuminating articles moving on a conveyor in a direction of travel under a camera, comprising the steps of directing a beam of light from the side of the conveyor at a downward angle toward the articles; and collimating the beam to direct the light at an angle equal to or greater than forty degrees from an optical axis of the camera and to form an illuminated strip on an upper surface of the articles transverse to the direction of travel.

In an alternative embodiment, a pair of additional illumination assemblies may be installed within the footprint of the camera's field of view, if necessary for tall articles. In another alternative configuration for any of the above embodiments, the reflector of the light source may be part of a cone-shaped figure, rather than part of a cylinder. As a result, the lamp is inclined with respect to the second focal axis of the reflector. This configuration allows the light to be focused parallel to the scan line despite the inclination of the lamp.

In another alternative embodiment, the light directing device can be a set of multiple apertures forming narrow slots across the reflector, under the lamp and perpendicular to the filament axis. Reflective and diffusing surfaces within the slots are configured to avert direct illumination of the articles by beams having an angle of incidence less than forty degrees from the camera's optical axis, and to create useful diffuse light from undesirable direct light beams.

BRIEF DESCRIPTION OF THE DRAWINGS

FIG. 2B is a cross sectional view taken along line 2B—2B of FIG. 2A.

DETAILED DESCRIPTION

Figure 1:
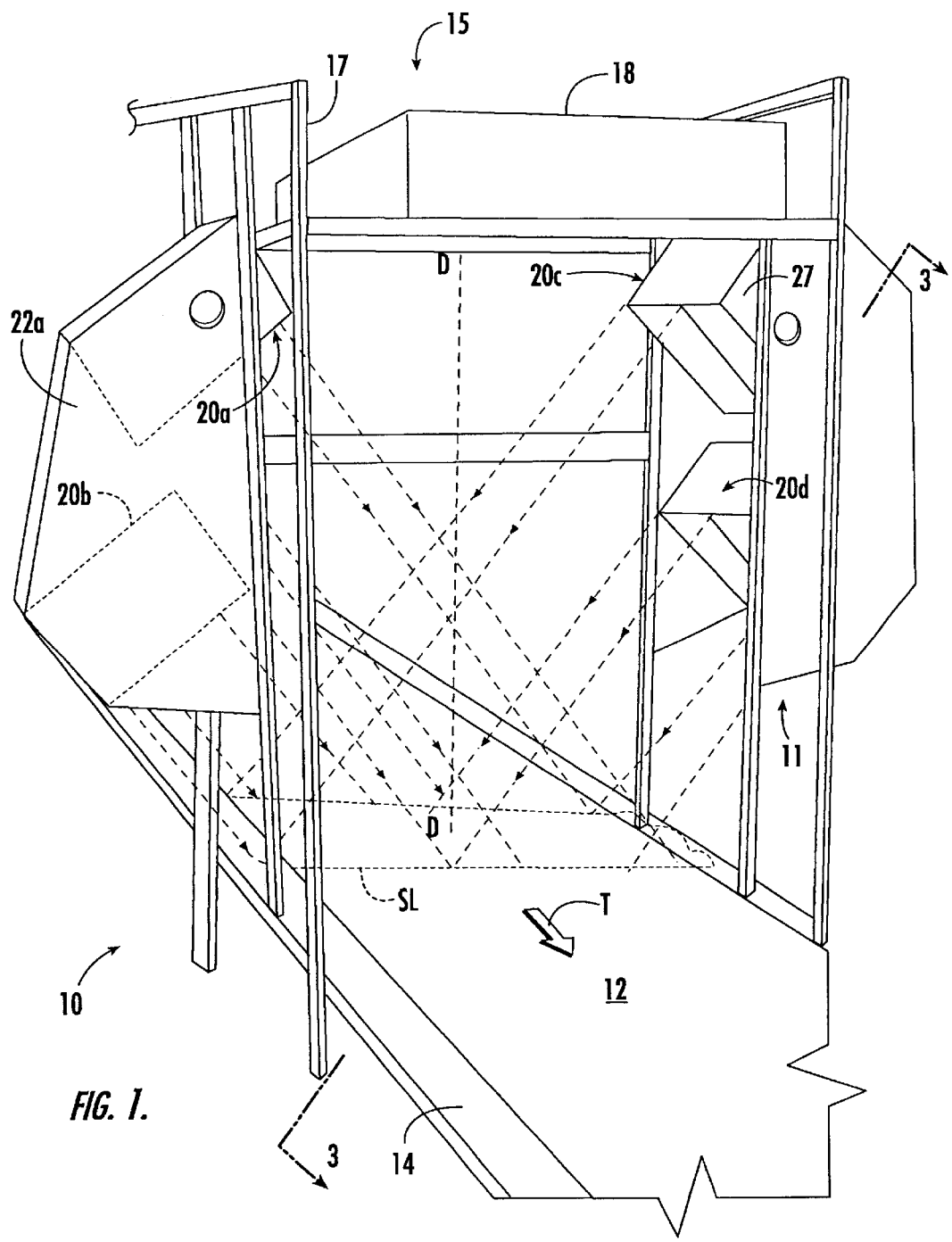
FIG. 1 is a perspective view of a conveyor system including an illumination apparatus embodying the present invention.

Referring now in more detail to the drawings, in which like numerals refer to like parts throughout the several views, FIG. 1 shows a conveyor system 10 including an illumination apparatus 11 embodying the present invention. The conveyor system 10 includes a conveyor belt 12 that travels in the direction of the arrow T on a conveyor bed 14, and an imaging station 15 that includes the illumination apparatus 11. In the imaging station, a superstructure 17 straddles the conveyor belt 12 and supports a camera 18 having an optical axis D-D directed vertically down to the conveyor belt.

Figure 5:
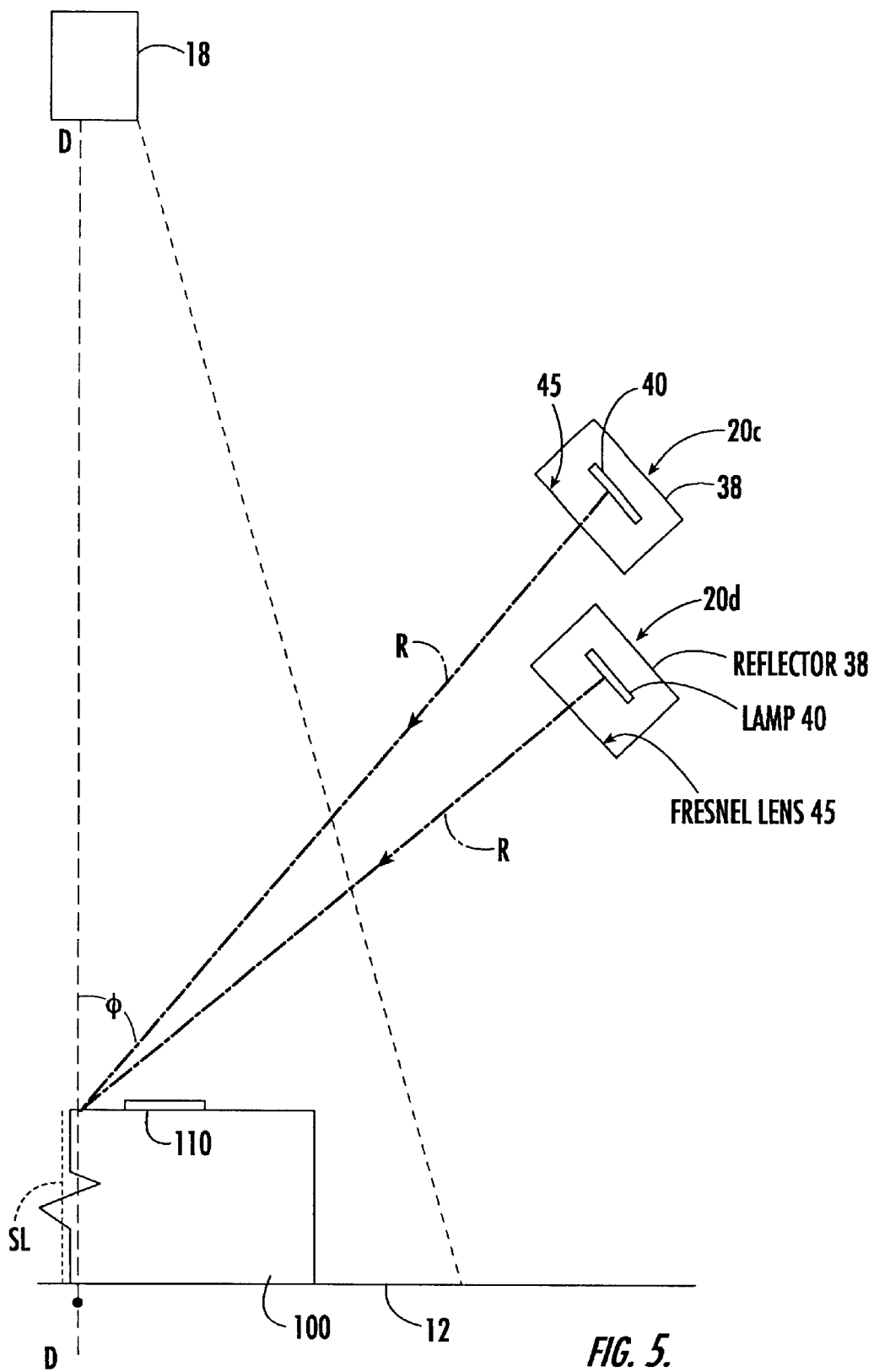
FIG. 5 is a diagrammatic partial front view of a conveyor system with two illumination assemblies shown on one side of the conveyor.

The camera 18 preferably is a linear CCD camera. The field of view of the camera has a width encompassing the width of the conveyor belt 12, and a length or thickness in the direction of travel T, for example 0.00535 inch (0.013589 cm). The camera scans a narrow strip (scan line SL) across the width of the conveyor belt 12 or across the upper surface of an article moving with the conveyor belt. Such a camera system is described in U.S. Pat. No. 5,308,960. The camera preferably has a long depth of focus or an automatic focusing apparatus, such as described in U.S. Pat. No. 5,245,172 or U.S. Pat. No. 5,485,263. As shown in FIG. 5, the articles traveling on the conveyor may be parcels, such as parcel 100 carrying a label 110 containing optically encoded symbols (for example, bar codes or two-dimensional dense codes such as the MaxiCode® symbol) or machine-readable text suitable for optical character recognition (OCR). The parcel will pass through the scan plane (projected vertically above the scan line) at a height determined by the height of the parcel. The illumination apparatus 11 must adequately illuminate the label 110 in the region SL spanning the scan line (shown in dotted outline on the conveyor in FIG. 1) regardless of whether the parcel is a flat envelope or the tallest parcel acceptable in the conveyor system 10. The term "article" used herein means an object or a label attached to an object.

In a known manner, the camera 18 acquires linear images of small strips within its field of view and assembles them in a computer memory to form a two-dimensional digital image of the top of the parcel 100 including the label 110. Computer software also known in the art then analyzes the image to locate and decode symbols and text in the image to assist in recognition and sorting of the parcel 100. The conveyor system 10 can also be used for processing components of manufactured goods or other articles carrying identifying indicia or having a shape discernable in an image.

The illumination apparatus 11 includes at least one lighting module 20. In the system shown in FIG. 1, four lighting modules 20a–20d illuminate the region SL. An upper left module 20a and a lower left module 20b are mounted in a left hood 22a attached to the superstructure 17 on the left side of the conveyor belt 12, as viewed in FIG. 1. An upper right module 20c and a lower right module 20d are mounted in a right hood 22b attached to the superstructure 17 on the right side of the conveyor belt 12. Each lighting module 20 is contained in a housing 27 that is secured at no less than about a forty degree angle with respect to the camera's optical axis D-D, and preferably at about a forty-five degree angle. The lighting modules and hoods are mounted alongside the conveyor, that is, substantially outside the footprint of the camera's field of view.

Figure 2A:
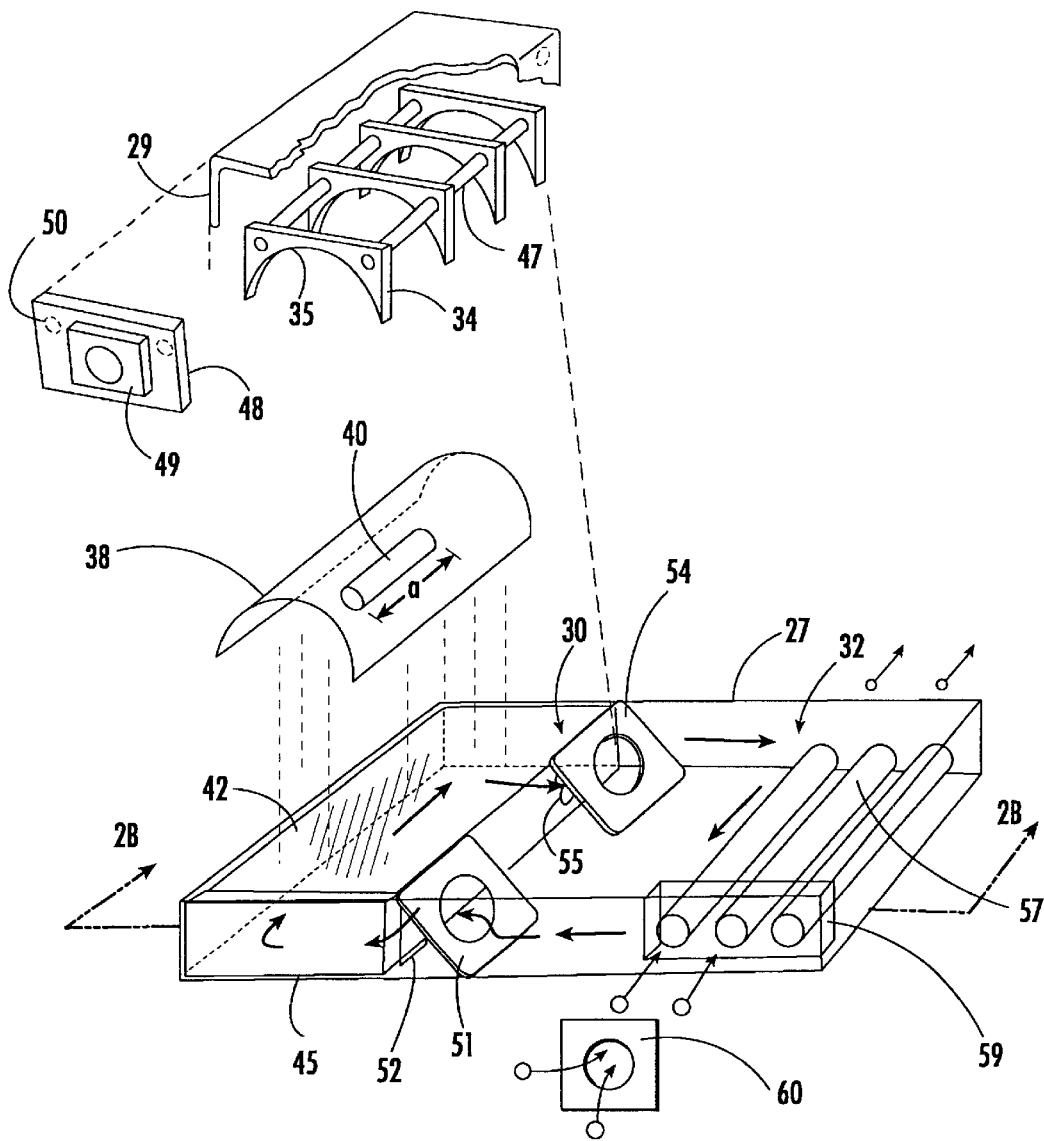
FIG. 2A is an exploded pictorial view of an illumination assembly including cooling systems for the lens and for the lamp

As shown in more detail in FIG. 2, the housing 27 defines a light chamber 29, a lens chamber 30 between the light chamber 29 and the conveyor belt 12, and a heat exchange chamber 32 adjacent to the lens chamber. At the boundary between the lens chamber 30 and the lighting chamber 29, the lighting chamber is enclosed by a glass plate 42. The light chamber 29 includes a plurality of spaced-apart struts 34 each defining an elliptical edge 35 facing the lens chamber 30. An elliptical reflector 38 fits against the edges 35 and fills the cross-section of the light chamber 29. At a first focal axis of the elliptical reflector 38, an elongated sodium lamp 40 is mounted within the lighting chamber. The reflector preferably is about 10–15 inches (about 25–38 cm) long, and the distance between the elliptical focal axes is about 63 inches (about 160 cm). The length a of the lamp 40 preferably is about 5 inches (about 12.7 cm). The reflector 38 is positioned, and its curvature selected, so that a second focal axis of the reflector preferably is about one inch (about 2.5 cm) below the conveyor belt 12. These parameters may be varied to suit different conveyor systems and different types or sizes of articles expected to be processed.

Figure 3:
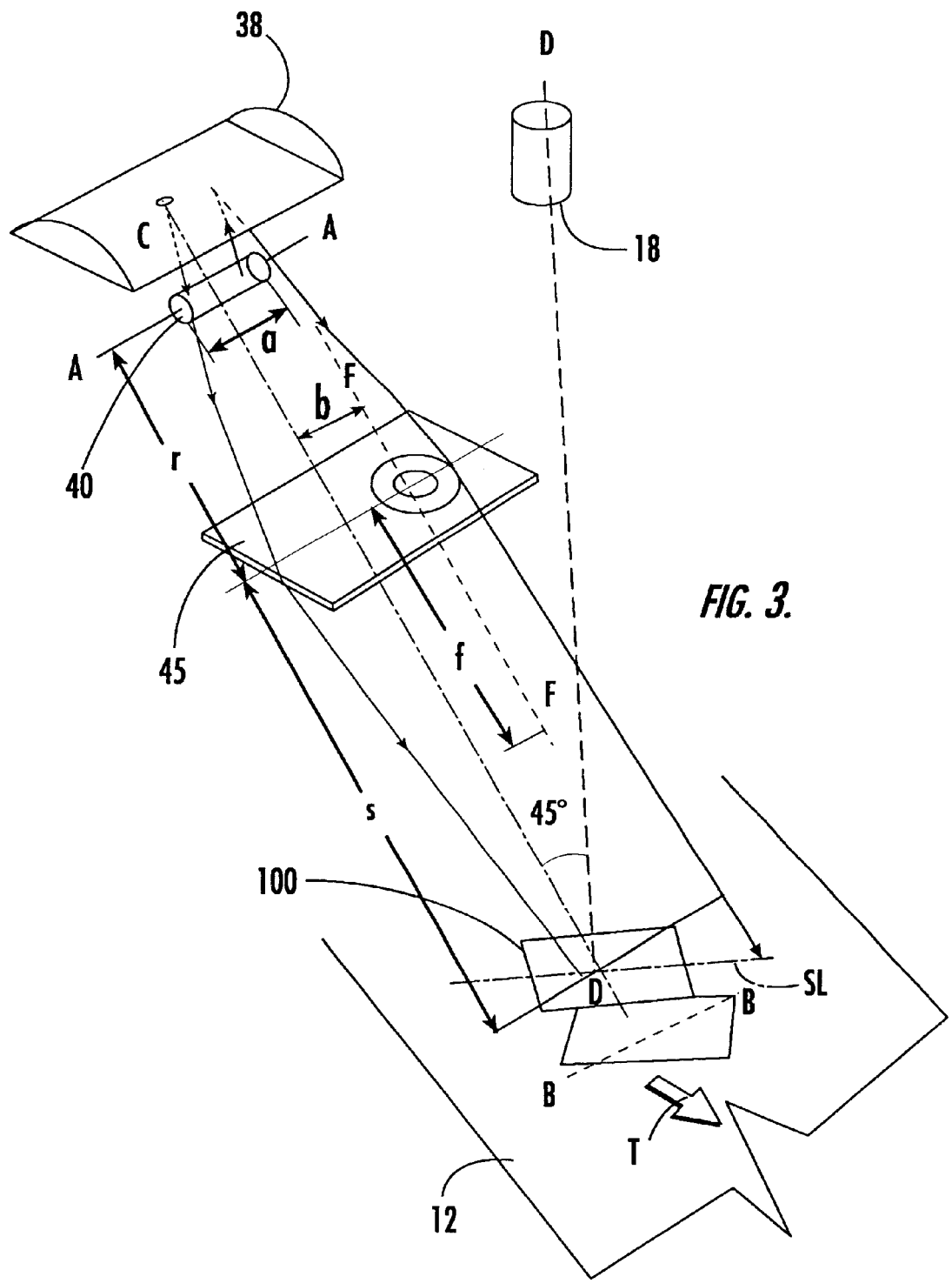
FIG. 3 is a diagrammatic exploded view of the components of the illumination assembly and their relation to the camera.
Figure 6:
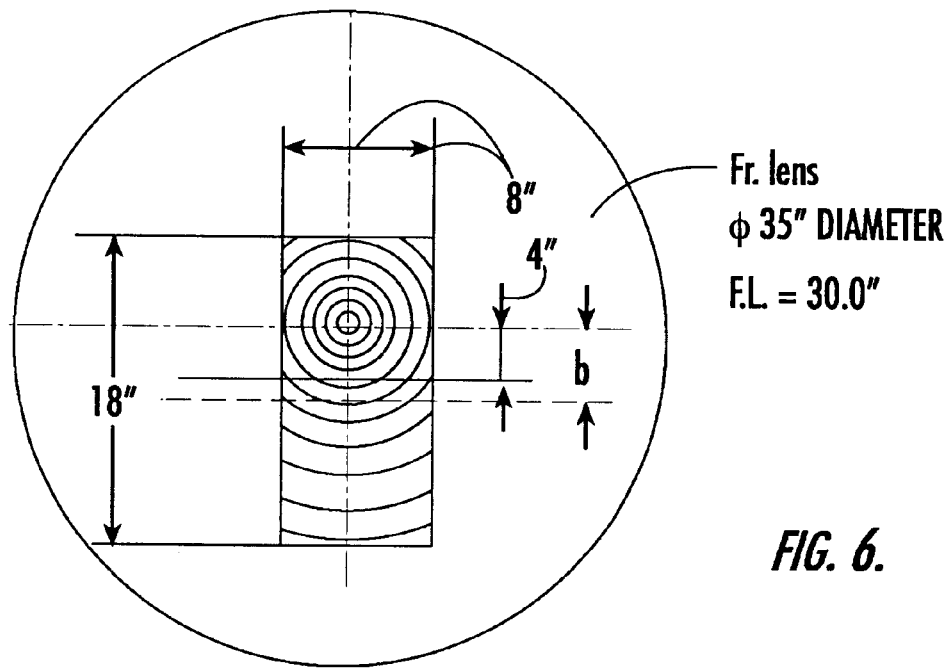
FIG. 6 is a front view of a Fresnel lens for use with the present invention.

A Fresnel lens 45 encloses the end of the lens chamber 30 opposite the glass plate 42. The chamber 30 preferably is empty, its walls providing a barrier to allow light from the lamp 40 and the reflector 38 to pass toward the conveyor 12 only through the lens 45. Acrylic plastic Fresnel lenses are commercially available having a 35 inch (89 cm) diameter and 30 inch (76 cm) focal length f. The lens 45 may be cut to fit the opening of the lens chamber 30, preferably about 8 inches (about 20.3 cm) wide by about 18 inches (about 45.7 cm) long. However, the lens is cut to fit the opening with the optical axis of the lens offset from the center of the chamber, as shown in FIG. 6. Preferably, the optical axis is approximately centered on the width of the chamber 30, but offset from the center along the length of the chamber a distance b from about 0.5 to 1 times the length of the lamp 40. In the preferred lighting assembly, the lamp 40 is about 5 inches (about 12.7 cm) long and the optical axis of the lens 45 is offset about 4 inches (about 10.2 cm). As best shown in FIG. 3, the depth of the lens chamber 30 is selected so that the distance r from the lamp 40 to the lens 45 is between about one-quarter and one-half the focal length of the lens 45. When the focal length f is 30 inches (76 cm), the distance r preferably is about 8 inches (about 20 cm).

Figure 7:
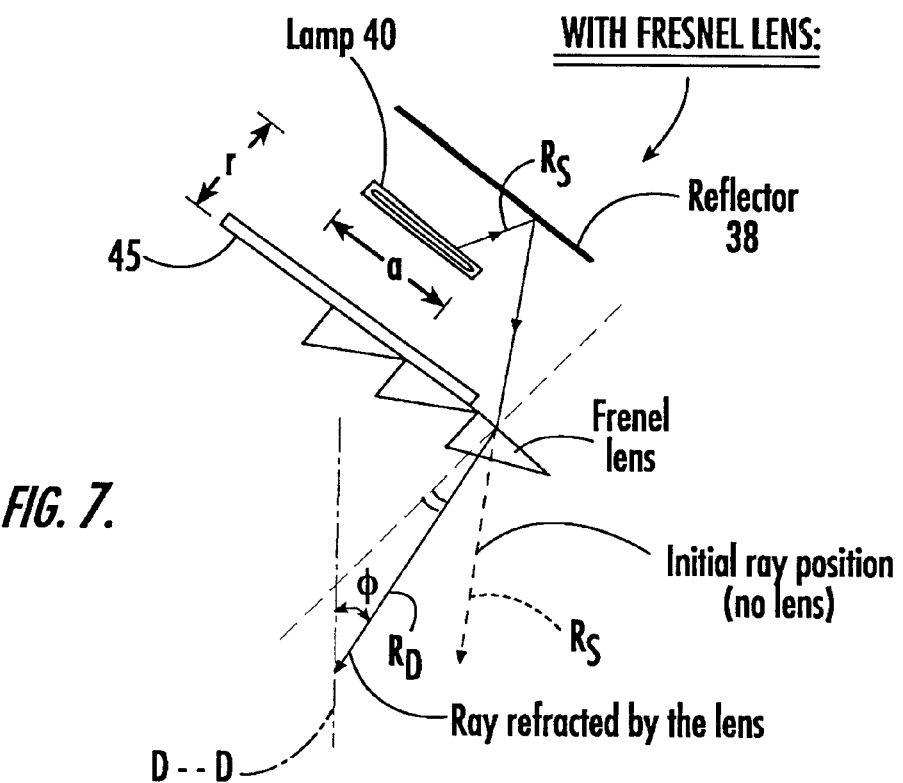
FIG. 7 is a diagrammatic, enlarged, partial side view of an illumination assembly showing the refractive function of the Fresnel lens.

The refraction of the light from the lamp 40 by a portion of the Fresnel lens 45 is shown diagrammatically in FIG. 7. An example ray $R_S$ emanating from the lamp is shown reflecting from the reflector 38 along a path (shown in dashed line) that would reflect specularly from an article on the conveyor to the camera 18. However, the triangular rib of the Fresnel lens 45 bends the ray to a path $R_D$ that makes an angle $\phi$ of at least 40 degrees with the optical axis D-D of the camera 18. Thus, the rays $R_D$ projected by the lens 45 toward the article on the conveyor will create diffuse reflection to the camera, not glare. Of course, light passing directly from the lamp to the lens is refracted similarly.

Figure 4:
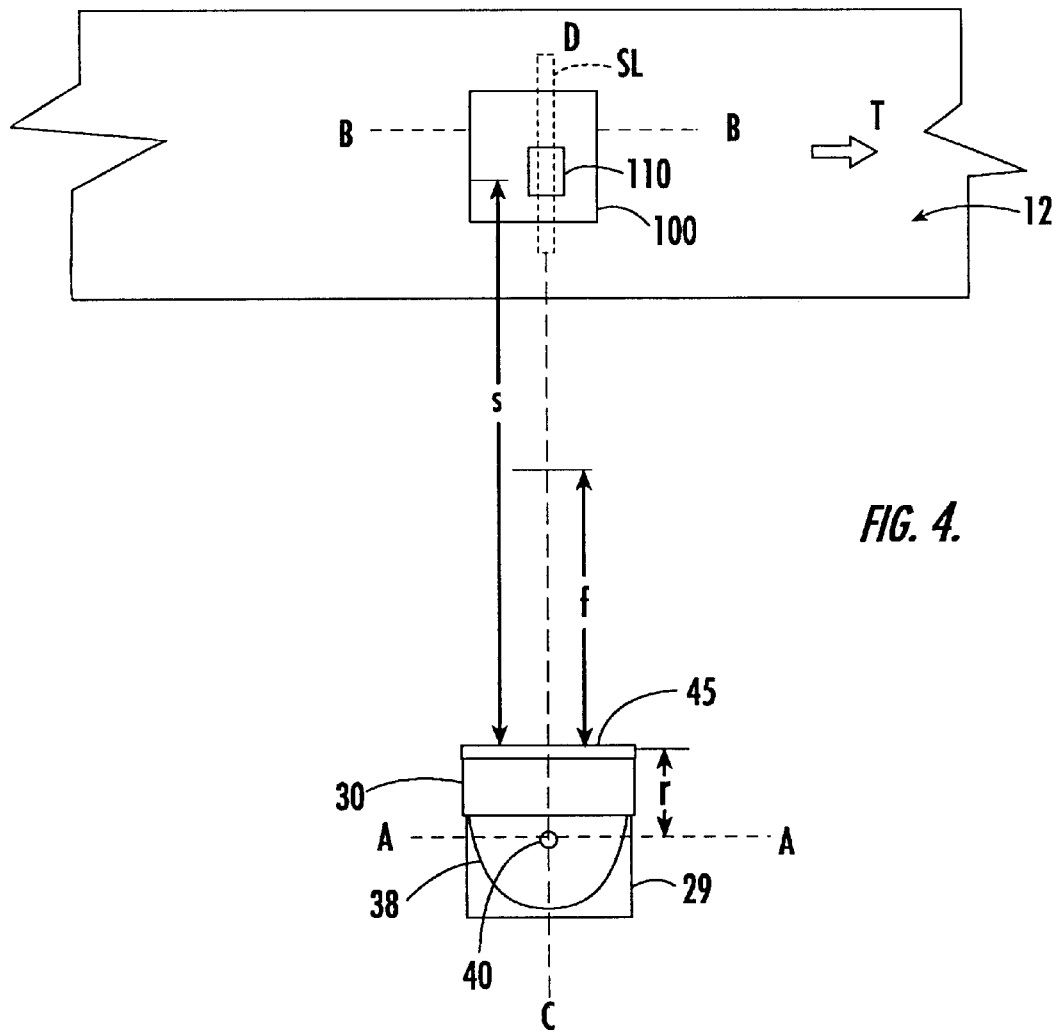
FIG. 4 is diagrammatic top view of the light source and its relation to an article being imaged.

The preferred configuration of the light source and light directing device with respect to the conveyor 12 is shown diagrammatically in FIGS. 3 and 4. A parcel 100 is shown on the conveyor 12. The axis of symmetry C-D of the reflector 38 makes an angle of about 45 degrees with the optical axis D-D of the camera 18. The lamp 40 lies along the first focal axis A-A of the reflector 38. The Fresnel lens 45 is spaced a distance r in front of the lamp, with its optical axis F-F parallel to but offset from the axis C-D by a distance b in a direction (along the camera axis D-D) away from the parcel 100. The lens 45 is positioned a distance s away from the scan line SL on the conveyor belt 12, the distance s being between about the focal length f and twice the focal length f. The second focal axis B-B of the elliptical reflector 38 preferably falls slightly below the conveyor belt, as shown in phantom in FIG. 4.

FIG. 5 shows, diagrammatically in cross section at the scan line SL, the preferred configuration of the illumination apparatus 11, looking back along the path of travel of the conveyor belt 12. The arrows R indicate the path of rays of light from the lamps 40 and the reflectors 38 of the lighting modules 20c and 20d on one side of the conveyor, the other side of the conveyor being substantially a mirror image. As shown, all the illuminating rays make an angle $\phi$ of 40 degrees or more, and preferably 45 degrees or more, with the optical axis D-D of the camera 18. This configuration provides adequate diffuse illumination to the camera for a sharp image, while avoiding specular reflection.

Returning to FIG. 2, the housing 27 contains two cooling systems, one for the lamp 40, and the other for the lens 45, which would otherwise melt in a short time. In the light chamber 29, a pair of heat exchange tubes 47 extend through the struts 34 on either side of the convex surface of the reflector 38. The tubes 47, made of a high heat conductivity material such as copper, are open to the outside air at one end of the chamber 29, and terminate at a thin plenum 48 at the other end of the chamber. The plenum 48 has a pair of openings 50 that communicate only with the open ends of the tubes 47. A fan 49 pressurizes the plenum 48 to force cooling air through the tubes. Heat generated by the lamp 40 travels through the reflector into the light chamber 29 surrounding the tubes, and then through the walls of the tubes into the cooler air passing through the tubes.

A recirculating air system cools the lens 45. Another fan 51 is mounted in the heat exchange chamber 32 adjacent to an inlet opening 52 connecting the chamber 32 to the lens chamber 30. The fan 51 is mounted at an angle to direct air downwardly onto the lens 45. The air sweeps around the chamber 30, cooling the lens 45, and is exhausted by a similarly tilted fan 54 through an outlet opening 55 at the opposite end of the chamber 30. A plurality of heat exchange tubes 57 extend across the chamber 32 at its end opposite the lens chamber 30. The tubes 57, made of a high heat conductivity material such as copper, are open to the outside air at one end of the chamber 32, and terminate at a thin plenum 59 at the other end of the chamber. A fan 60 pressurizes the plenum 59 to force cooling air through the tubes 57. The air exhausted from the lens chamber 30 by the fan 54 sweeps around the chamber 32 and over the heat exchange tubes 57, transferring heat to the cooler air flowing within the tubes. The fan 51 then forces the cooler air back across the lens 45. If desired, appropriate baffles can be positioned in the lens and heat exchange chambers to direct the flow of recirculating air.

The recirculating air cooling systems with heat exchangers are enclosed to prevent dust from contacting the optics.

In operation, the illumination apparatus 11 projects light from the sides of the conveyor belt 12 as a parcel 100 or other article travels under the imaging station 15. With the lamp 40, reflector 38, and lens 45 configured within the limits described above, light shining on the parcel is angled at 40 degrees or more from the camera's optical axis. As shown in FIGS. 1 and 5, the projected light illuminates a region across the conveyor including the scan line SL of the camera 18 and extending above the conveyor as high as the highest expected parcel. As the parcel passes through the illuminated region, diffuse light reflected from the parcel, and particularly from a label 110 bearing optically encoded symbols and sometimes machine-readable text, reaches the camera 18. Specular reflection is directed away from the camera, avoiding glare. The camera acquires a series of narrow images, which its processor builds into a digital image of the entire field of view. Software known in the art can analyze the image to find symbols and text blocks, and then to decode the information on the label. During operation of the lamp 40, the cooling systems shown in FIG. 2 protect the lens from overheating.

Figure 8:
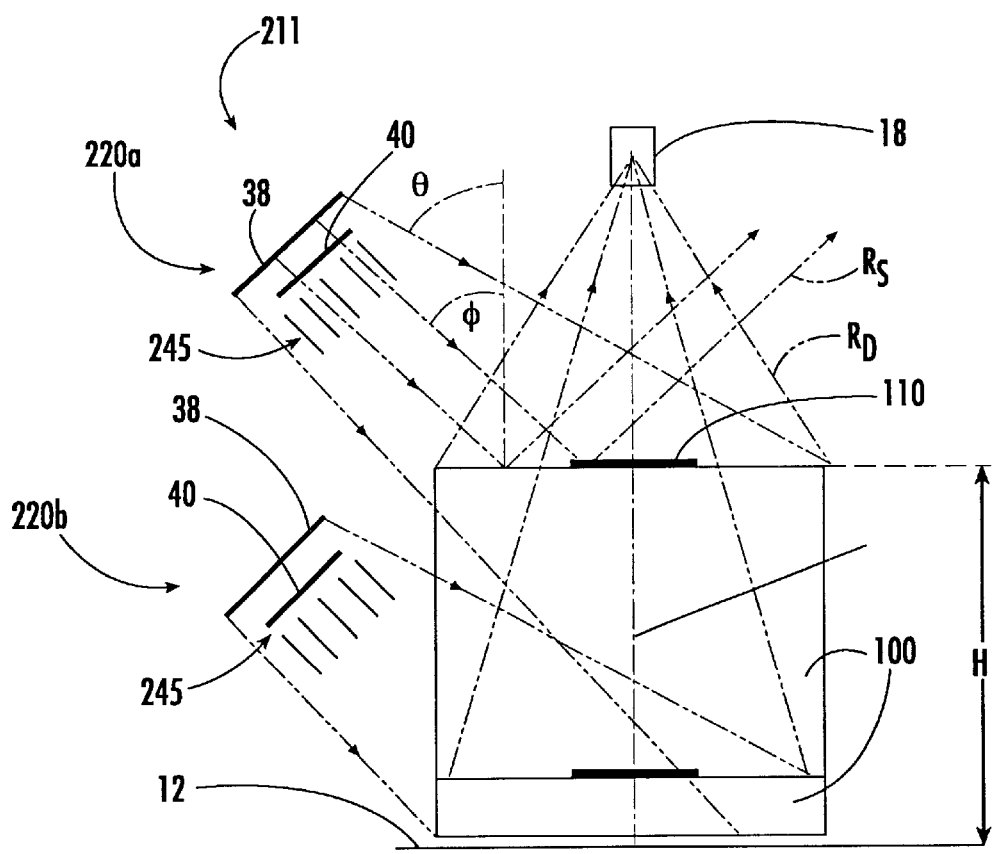
FIG. 8 is a diagrammatic front view of another embodiment of the invention incorporating an alternative light directing device.

FIG. 8 shows a second embodiment of an illumination apparatus 211 according to the present invention, incorporating an alternative light directing device. Two different height parcels 100 are shown on the conveyor belt 12. They are illuminated by two lighting modules 220a and 220b, which are similar to the modules 20 of the first embodiment, except that the Fresnel lens is replaced by a set of baffle plates 245, shown in detail in FIG. 9. A plurality of parallel baffle plates 248 are positioned perpendicular to the lamp 40 and parallel to the axis of symmetry of the reflector 38. Preferably, each module has twelve baffle plates extending about 8 inches (20 cm) parallel to the axis of symmetry of the reflector, and positioned about 0.75 inch (1.9 cm) apart, to form a series of slots for receiving light directly from the lamp and also reflected from the reflector. The plate surface on one side of each slot is a completely specular or mirror-like surface 252. In the configuration shown in FIG. 8, the fully specular surface 252 of each plate 248 faces slanted upwardly with respect to the camera's optical axis D-D, as a result of the tilting of the light source. The other, downwardly facing surface is divided into two parts on either side of a midpoint 250, a specular portion 253 nearest to the lamp 40, and a diffuse portion 254. The portion 254 may be made irregular in a manner known in the art so that light reflects diffusely from the surface.

Figure 9:
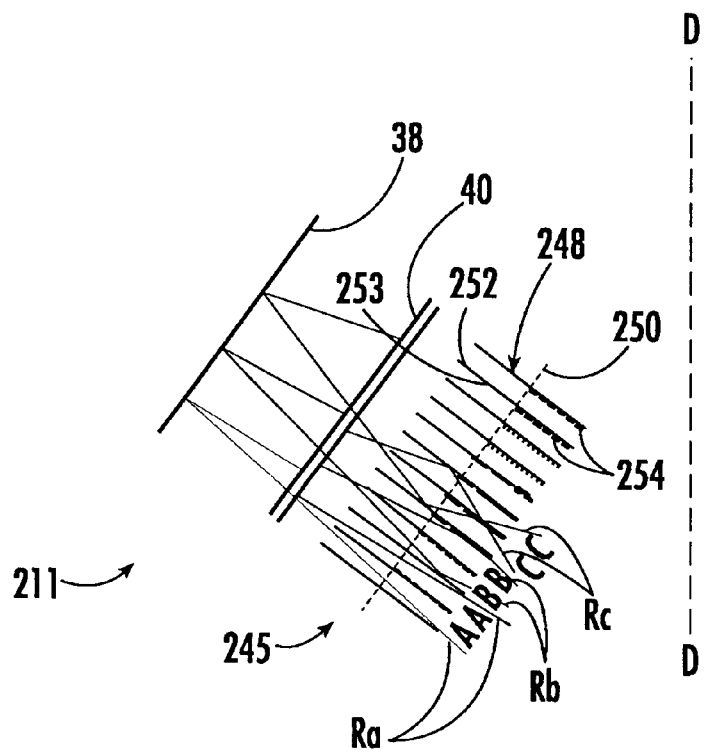
FIG. 9 is a detailed diagrammatic view of the light directing device and light source of FIG. 8.

In FIG. 9, the first two slots are shown being traversed by beams $R_a$ leaving the lamp and the reflector at angles of +5 and −5 degrees. These beams pass through the slot without touching the plates, and will reach a target parcel or other article at angles of 40 and 50 degrees, respectively, as a result of the tilting of the light source. The next two slots show beams $R_b$ leaving the lamp and the reflector at angles of +10 and −10 degrees. These beams hit the plates 248 defining the slot near their outer edges. The lower specular surface 252 reflects a 10 degree beam and redirects it toward the parcel at a 55 degree angle. The upper diffuse surface 254 spreads a 10 degree beam diffusely on the parcel. The next two slots show beams $R_C$ leaving the lamp and the reflector at angles of +20 and −20 degrees. These beams will undergo at least two reflections within a slot. Any beam that would undergo a specular reflection aiming it at the parcel at an undesirable angle (greater than 40 degrees) will undergo a diffuse reflection before exiting the slot. Beams of light that pass above the plate set 245 are at angles θ equal to or greater than 40 degrees to the camera optical axis.

While the embodiment of FIGS. 8 and 9 is effective, the first embodiment using a Fresnel lens is more efficient in use of light energy output by the lamps.

Figure 10:
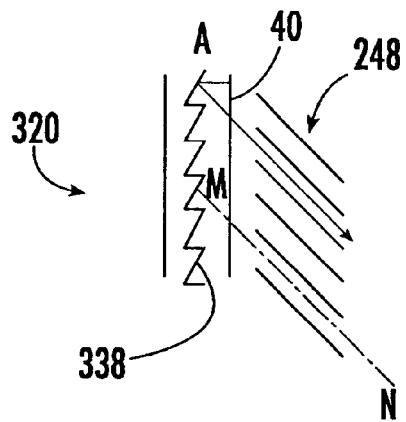
FIG. 10 is a diagrammatic view of an alternative reflector for use with vertical lamp filaments.

Some high intensity lamps useful for illuminating articles work only in a horizontal or vertical position, so the lamp itself cannot be tilted. FIG. 10 shows a lighting module 320 including a lamp 40 in a vertical configuration flanked by a set of plates 248 angled at 45 degrees toward the target article. An elliptical reflector 338 defines rib-like segments having an angle of inclination of 22.5 degrees to the lamp axis. Light from the lamp that strikes these angle segments is reflected into the slots formed by the plates 248. Thus, the light from the vertical lamp is directed into the light directing device, which operates in the manner described above in connection with FIGS. 8 and 9. It will be apparent that the same approach can be used to form a ribbed reflector that can direct light from a horizontal lamp into the light directing device, and that these embodiments can be used on both sides of a conveyor belt.

Figure 11:
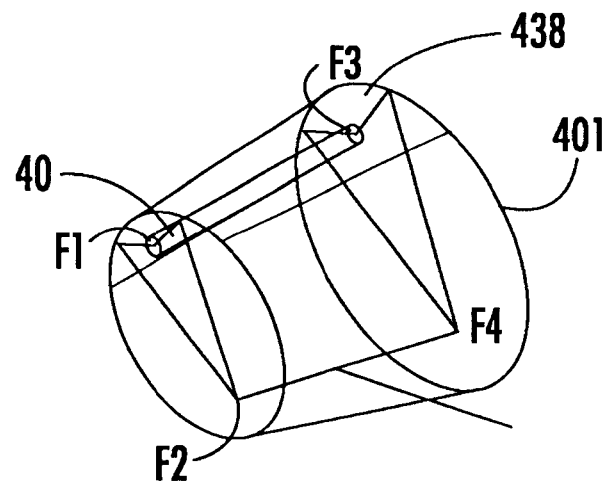
FIG. 11 is a diagrammatic view of an alternative cone-shaped reflector configured to compensate for a tilted lamp.

An alternative shape for any of the reflectors described above is shown in FIG. 11. In this embodiment, the elliptical reflector 438 is part of a cone-shaped FIG. 401, rather than part of a cylinder as is the reflector 38 shown in FIG. 4. As a result, the lamp 40 lying along the first focal axis F1-F3 is inclined with respect to the second focal axis F2-F4. This configuration allows the light to be focused parallel to the scan line SL despite the inclination of the lamp.

Figure 13:
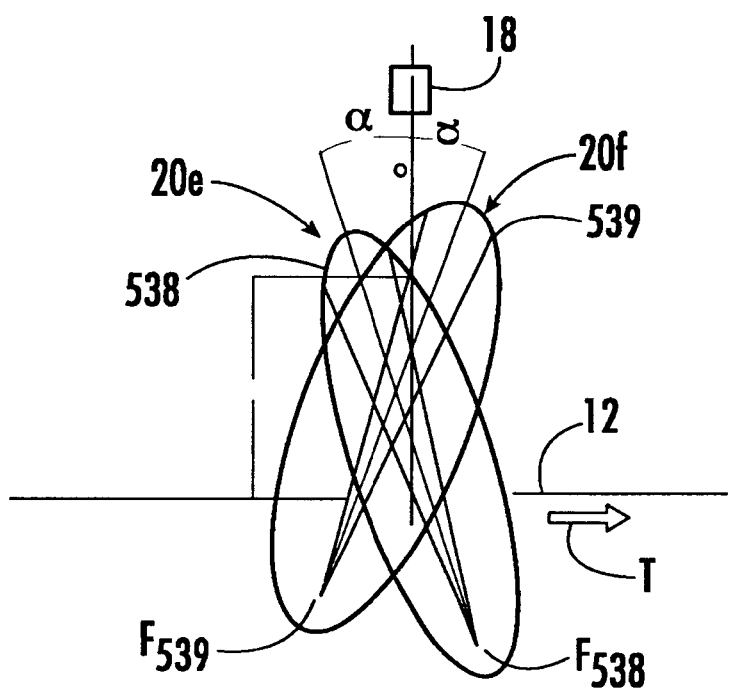
FIG. 13 is a side view of the embodiment of FIG. 12.
Figure 12:
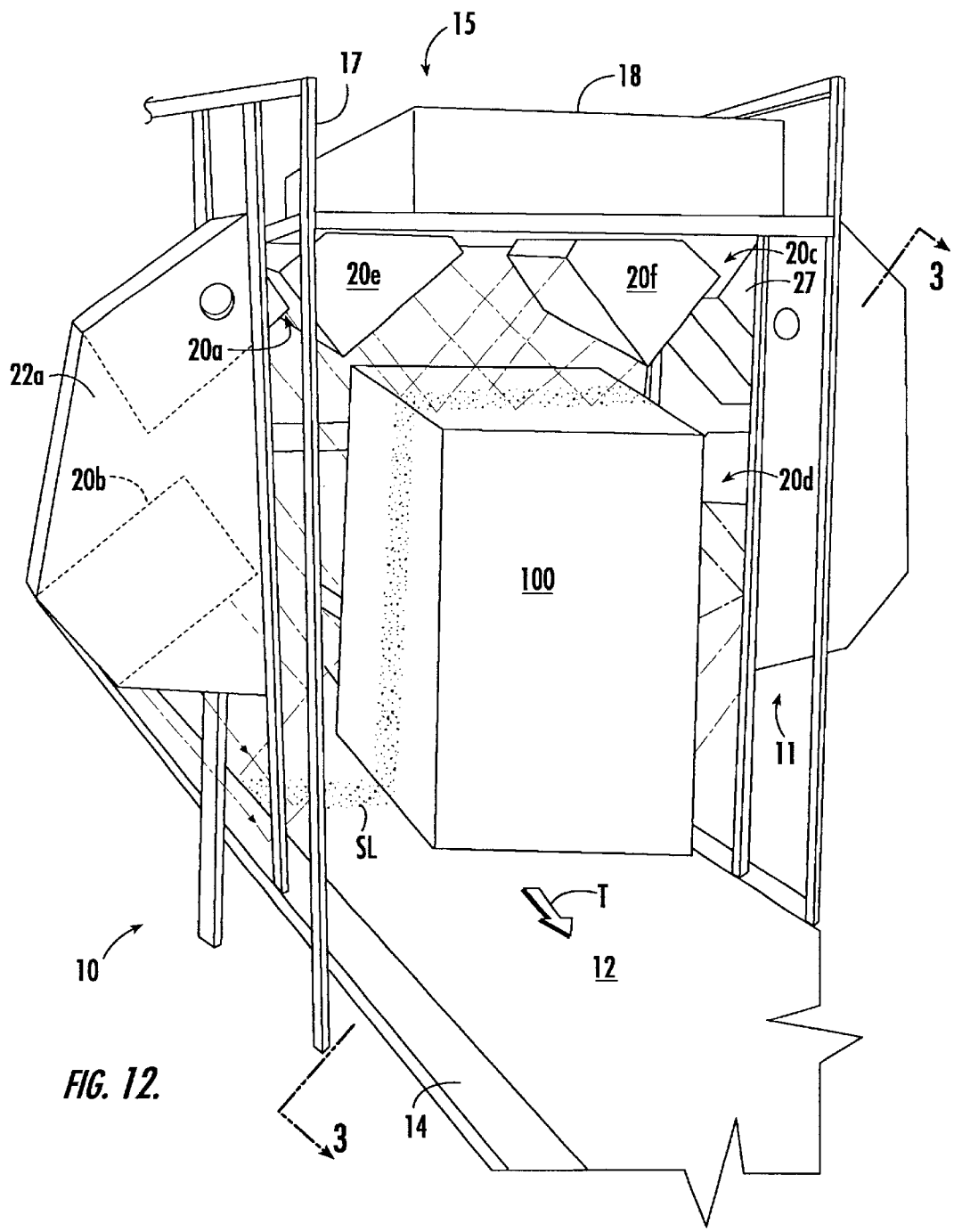
FIG. 12 is a perspective view showing positioning of additional illumination assemblies in another embodiment of the invention.

In some circumstances it may be necessary to originate illumination from within the footprint of the camera's field of view to illuminate tall articles. In such a case the preferred configuration is shown in FIG. 12 and FIG. 13, looking from the side of the conveyor 12. Two additional lighting modules 20e and 20f are installed, one on each side of the centerline of the conveyor, but inside the lateral position of the modules 20a and 20c. The reflectors 538 and 539 of the modules 20e and 20f are angled laterally outwardly at about 45 degrees from the camera optical axis, like the other reflectors 38. However, the reflectors 538 and 539 also are angled by relatively small angles α and γ out of the scan plane. Preferably, the angle α is about 15 degrees behind the scan plane, and the angle γ is about 20 degrees ahead of the scan plane. The reflector 538 is focused at secondary axis F538, farther below the conveyor belt 12 than the secondary axis F539 or the reflector 539. Thus, each reflector 538, 539 illuminates a certain area of height span above the scan line.

From the foregoing description, it can be seen that the present invention provides illumination to an overhead imaging camera by reflecting diffuse light to the camera from articles of varying heights. The main embodiments of the invention have the advantage of originating the light rays from outside the footprint of the field of view of the camera. By constraining essentially all of the light rays to angles 40 degrees or more from the optical axis of the camera, the system avoids a level of specular reflection or glare that would deteriorate the image of symbols or text on the surface of the articles. Furthermore, the invention makes novel use of Fresnel lenses to collimate and control the light rays, providing diffuse illumination with minimum loss of light energy.

While this invention has been described in detail with particular reference to preferred embodiments thereof, it will be understood that modifications and variations may be made without departing from the scope of the invention as defined in the appended claims.

What is claimed is:

1. In a system for conveying articles on a conveyor in a direction of travel under a camera, an apparatus for illuminating an upper surface of said articles, comprising:
    an elongated light source positioned alongside said conveyor, with a longitudinal axis of said light source forming an angle from the horizontal;
    said light source including a lamp and an elongated reflector positioned to reflect light from said light source toward articles on said conveyor; and
    a light directing device positioned between said light source and said conveyor to receive light from said light source and to direct the light toward articles on said conveyor at an angle equal to or greater than forty degrees from an optical axis of said camera; and
    a barrier positioned to confine the light illuminating said articles to light passing through said light directing device.

2. The system of claim 1, wherein the longitudinal axis of said light source is approximately perpendicular to said path of travel.

3. The system of claim 1, wherein said reflector is an elliptical surface and wherein said lamp is an elongated lamp lying along a focal axis of said elongated reflector.

4. The system of claim 3, wherein a second focal axis of said elongated reflector lies a distance beneath said conveyor.

5. The system of claim 1, wherein said light directing device comprises a Fresnel lens.

6. The system of claim 5, wherein said Fresnel lens is positioned a distance from said lamp from about ¼ to about ½ times the focal length of said Fresnel lens.

7. The system of claim 6, wherein the optical axis of said Fresnel lens is offset from the axis of symmetry of said reflector.

8. The system of claim 7, wherein the optical axis of said Fresnel lens is offset from the axis of symmetry of said reflector by a distance from about 0.5 to 1 times the length of said lamp.

9. The system of claim 8, wherein said Fresnel lens is positioned a distance from a central axis of said conveyor approximately equal to 1 to 2 times the focal length of said Fresnel lens.

10. The apparatus of claim 7, wherein said Fresnel lens is offset from the axis of symmetry of said reflector to a position farther from said conveyor.

11. The system of claim 10, wherein said assembled light source and Fresnel lens comprise a first illumination assembly and further comprising a second illumination assembly positioned alongside said conveyor above said first illumination assembly.

12. The system of claim 11 further comprising a third and a fourth illumination assembly positioned above one another, across said conveyor from said first and second illumination assemblies.

13. The system of claim 1, wherein said assembled light source and Fresnel lens comprise a first illumination assembly and further comprising a second illumination assembly positioned alongside said conveyor above said first illumination assembly.

14. The system of claim 13, further comprising a third and a fourth illumination assembly positioned above one another, across said conveyor from said first and second illumination assemblies.

15. The system of claim 1, wherein said assembled light source and Fresnel lens comprises a first illumination assembly and further comprising a second illumination assembly positioned across said conveyor from said first illumination assembly.

16. The system of claim 1, wherein said lamp, reflector, light directing device, and barrier are selected, assembled and oriented such that said articles are illuminated from the side of said conveyor, and such that essentially all of the light exiting said light directing device is aligned at an angle equal to or greater than forty-five degrees from the optical axis of said camera, and such that diffuse reflection but essentially no specular reflection from said articles of light from said light source reaches said camera.

17. The system of claim 1, wherein said light directed by said light directing device forms an illuminated strip on an upper surface of said articles transverse to said direction of travel.

18. The system of claim 1, where said light directing device comprises a set of multiple plates positioned on an article side of the lamp opposite the reflector to form narrow slots across the reflector, perpendicular to the filament axis, portions of said plates positioned to receive light that would reflect specularly to said camera being diffusing surfaces.

19. An apparatus for illuminating a surface of an article being imaged by a camera, comprising:
    an elongated light source positioned alongside said article to direct light from said light source toward said article, a longitudinal axis of said light source forming an angle with said surface; and
    a Fresnel lens positioned between said light source and said article to receive light from said light source and to direct the light toward said article at an angle equal to or greater than forty degrees from an optical axis of said camera;
    said light source being located closer to said Fresnel lens than the focal length of said Fresnel lens, and the optical axis of said Fresnel lens being offset from an axis of symmetry of said light source.

20. The apparatus of claim 19, wherein said light source includes an elongated lamp and an elongated reflector, and wherein said Fresnel lens is positioned a distance from said lamp from about ¼ to about ½ times the focal length of said Fresnel lens, and the optical axis of said Fresnel lens is offset from the axis of symmetry of said reflector by a distance from about 0.5 to 1 times the length of said lamp.

21. The apparatus of claim 20, wherein said Fresnel lens is offset from the axis of symmetry of said reflector to a position farther from said article.

22. A method for illuminating articles moving on a conveyor in a direction of travel under a camera, comprising the steps of:
    directing a beam of light from the side of said conveyor at a downward angle toward said articles; and collimating said beam to direct the light at an angle equal to or greater than forty-five degrees from an optical axis of said camera and to form an illuminated strip on an upper surface of said articles transverse to said direction of travel.

23. The method of claim 22 wherein said step of collimating said beam comprises collimating said beam with a Fresnel lens.

24. In a system for conveying articles on a conveyor in a direction of travel under a camera, an apparatus for illuminating an upper surface of said articles, comprising:

an elongated light source positioned alongside said conveyor, with a longitudinal axis of said light source forming an angle from the horizontal;

said light source including a lamp and an elongated reflector positioned to reflect light from said light source toward articles on said conveyor; and said reflector being part of a cone-shaped figure having a first focal axis approximately colinear with said lamp, and a second approximately horizontal focal axis adjacent to said conveyor.

\* \* \* \* \*

UNITED STATES PATENT AND TRADEMARK OFFICE
CERTIFICATE OF CORRECTION

PATENT NO.    : 6,352,349 B1
DATED         : March 5, 2002
INVENTOR(S)   : Braginsky et al.

It is certified that error appears in the above-identified patent and that said Letters Patent is hereby corrected as shown below:

Title page,
Item [73], Assignee, "Services" should read -- Service --.
Item [56], References Cited, U.S. PATENT DOCUMENTS, insert the following:
-- 5,737,122    4/1998       Wilt et al.
5,859,418      1/1999       Li et al. --.

Column 4,
Line 3, please insert a period (-- . --) immediately after "lamp".
Line 9, please insert -- a -- immediately after "is".

Column 9,
Line 60, "apparatus" should read -- system --.

Column 10,
Line 32, "where" should read -- wherein --.

Signed and Sealed this

Twenty-ninth Day of October, 2002

Attest:

Attesting Officer

JAMES E. ROGAN
Director of the United States Patent and Trademark Office